April 6, 1937.                D. L. WOOD                    2,076,190
                         PROJECTION OBJECTIVE
                         Filed Sept. 26, 1934

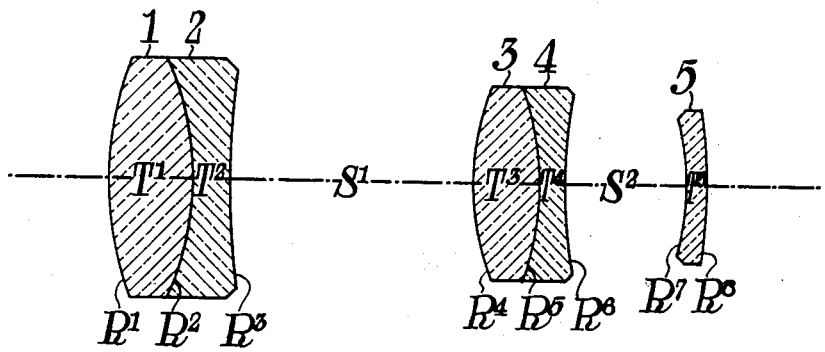

F.1.6 : Focal Length = 100.00

| Lens | Glass | Radii | Thickness & Separation |
|---|---|---|---|
| 1 | D = 1.52628<br>V = 59.6 | $R^1 = +71.4$<br>$R^2 = -68.5$ | $T^1 = 21.9$ |
| 2 | D = 1.61644<br>V = 36.6 | $R^3 = +936.0$ | $T^2 = 3.52$<br>$S^1 = 77.3$ |
| 3 | D = 1.51565<br>V = 64.0 | $R^4 = +34.75$<br>$R^5 = -53.4$ | $T^3 = 17.54$ |
| 4 | D = 1.61644<br>V = 36.6 | $R^6 = +255.5$ | $T^4 = 3.52$<br>$S^2 = 19.6$ |
| 5 | D = 1.61644<br>V = 36.6 | $R^7 = -34.75$<br>$R^8 = -246.8$ | $T^5 = 1.985$ |

*Focal length of Front Component is +177.8*
*Focal length of Second Component is +88.9*
*Focal length of Rear Component is -65.7*

Inventor:
Donald L. Wood,
By Newton M. Perkins
Rolla N. Carter
Attorneys

UNITED STATES PATENT OFFICE 2,076,190

PROJECTION OBJECTIVE

Donald L. Wood, Rochester, N. Y., assignor, by mesne assignments, to Eastman Kodak Company, Jersey City, N. J., a corporation of New Jersey Application September 26, 1934, Serial No. 745,570

6 Claims. (Cl. 88—57)

My invention relates to objectives and more particularly to large aperture objectives of the Petzval type.

It is an object of my invention to provide an objective particularly suited for the projection of motion picture film where large aperture and good definition are prime prerequisites.

In 16 mm. motion picture projection the trend has been continuously toward increased screen illumination. The most recent steps in this direction have been the introduction of higher wattage lamps, the filament dimensions of which have been increased over those of the light sources heretofore used in sub-standard projectors. It has been found that the most effective condensing systems for these larger scurces will produce a filament image of such dimensions that, for proper utilization of the source, the projection lens must have a relative aperture considerably in excess of the 1 : 2 ratio commonly used.

It has been the common practice in amateur projection equipment to employ projection lenses of the Petzval type, consisting of two cemented doublet components separated by a relatively large air space, approximately 75% of the equivalent focal length of the combination. The resulting short back focal length has proved to be desirable and a very satisfactory degree of contrast in the projected screen image has been obtained by reducing the number of glass to air surfaces from eight (as in other large aperture projection lenses) to four in the Petzval type lens. The well corrected spherical aberration in this lens also affords very keen axial definition, even at large aperture ratios.

It has been found, however, that if the aperture ratio of the Petzval type lens is increased to some such value as 1 : 1.6, as required by the larger light sources mentioned above, the inherently curved field of this type of lens is objectionable and limits the useful angular covering power to about 5° from the optical axis.

It is an object of my invention to provide an objective for projection purposes which will have a substantially flat field at an aperture of approximately $f.1.6$ and this without disturbing the above mentioned advantages of the Petzval type lens.

I have discovered that this defect may be overcome, and at the same time the aforementioned advantages largely preserved, by the addition of a negative third element of relatively strong refractive power, situated close to the focal point of the two positive elements. The negative element may be considered to operate by lengthening the optical path of the oblique pencils proportionately more than that of the axial pencil because of the greater thickness of glass near the edges of the field. An element meeting this requirement may take the form of a plano-concave lens for practical reasons, or may be double concave or meniscus, and will have such curvatures that the thickness of glass at the margin of the field, over and above the axial thickness, when multiplied by the factor $$\frac{n-1}{n}$$

will be approximately equal to the departure of the normal Petzval lens field from a plane through the axial focus.

In practice, other lesser advantages are also obtained from the lens construction described, namely, (1) the enclosing of the space immediately in front of the projector aperture by the lens mount, as a result of the very short back focal length of the system, so that stray light usually emanating from this point is intercepted and absorbed and (2) the larger lens elements are enclosed and protected from dirt and oil spray by the smaller diameter negative element, which is more accessible and easily cleaned.

The accompanying drawing shows a constructional example of a projection lens according to my invention. This example comprises an ordinary Petzval lens having a front collective component composed of two cemented lens elements 1 and 2 and a rear collective component composed of two cemented lens elements 3 and 4. This lens is characterized by its very well corrected spherical aberration and its anastigmatic but inwardly curved field. To overcome this latter defect, I place as near as is practical to its focal plane a strong negative lens 5 having a general shape such that its thickness at any point off the axis of the system, over and above its axial thickness, is approximately three times the amount by which the field at that point departs from a plane through the focus. The additional lens element 5 functions to flatten the field by lengthening the path of the oblique pencils proportionately more than the axial pencil and, since it is located so near the back focal plane of the system, the other corrections of the lens are not disturbed.

The following table shows the data for a projection lens designed to work at an aperture of f.1.6 and to have a substantially flat field. In the table and on the accompanying drawing, the successive lenses from front to rear are designated 1 to 5 respectively; the radii of curvatures of the successive surfaces, $R^1$ to $R^8$, the thicknesses of the successive lenses $T^1$ to $T^5$, and the widths of the air spaces $S^1$ and $S^2$. There is also given in the table the index of refraction of the glass for the D line only, since this is a projection lens, and the value of the dispersive ratio ($\nu$) for the glass used. The following figures are for an objective having a focal length of 100 units.

| Lens | Glass | Radii | Thickness and separation |
|---|---|---|---|
| 1 | $D= 1.52628$ $\nu=59.6$ | $R^1+71.4$ | $T^1=21.9$ |
|  |  | $R^2 69..3$ |  |
| 2 | $D= 1.61644$ $\nu=36.6$ | $R^3+936$ | $T^2= 3.52$ |
|  |  |  | $S^1=77.3$ |
| 3 | $D= 1.51385$ $\nu=64.0$ | $R^4+34.75$ | $T^3=17.54$ |
|  |  | $R^5-53.4$ |  |
|  |  |  | $T^4= 3.52$ |
| 4 | $D= 1.61644$ $\nu=36.6$ | $R^6+235.5$ |  |
|  |  |  | $S^2=19.6$ |
| 5 | $D= 1.61644$ $\nu=36.6$ | $R^7-34.75$ | $T^5=1,985$ |
|  |  | $R^8-246.8$ |  |

The focal length of the front component is $+177.8$; that of the second component is $+88.9$, and that of the single rear element is $-65.7$.

The objective of my invention due to its large aperture and flat field will project more light on the screen with satisfactory definition. This objective is also admirably suited for the projection of lenticular color film and accordingly I prefer to make it comply with the present standard which requires the apparent filter position to be 38.5 mm. in front of the focal plane. This requirement is met by the present objective, if it is given a focal length of 50.80 mm. and the filter is positioned 2.13 mm. in front of the front element. The data for an objective of this focal length may of course be obtained by multiplying by 0.508 the dimensions given in the above table. The objective thus computed would have a back focus of 2.70 mm. which means that the rear surface of lens element 5 is this distance in front of the focal plane of the objective.

While I have described and given data for the preferred form of my invention, it is to be understood that I do not wish to be limited thereby, but desire to cover all modifications and equivalents which fall within the scope of the appended claims.

What I claim as new and desire to secure by Letters Patent of the United States, is:—

1. A projection objective of the Petzval type corrected for spherical aberration, astigmatism and curvature of field comprising two convergent components having an inwardly curved image field, each of said components consisting of a biconvex element cemented to the front of a biconcave element and being separated axially from each other by substantially 75% of the equivalent focal length of the combination, and a rear divergent meniscus lens element with its front surface concave positioned near and in front of the image plane, said rear element having a focal length which is numerically less than the focal length of either of the convergent components and being made of glass having a refraction index for the D line greater than 1.60.

2. A projection objective of the Petzval type corrected for spherical aberration, astigmatism and curvature of field, comprising two convergent components having an inwardly curved image field, said components being cemented doublets spaced axially by substantially 75% of the equivalent focus of the combination and a rear divergent lens element positioned near and in front of the image plane, said rear element being formed so that the difference between its axial thickness and its thickness at any point off the axis is approximately three times the amount by which the field of the converging components departs at that point from a plane.

3. A projection objective of the Petzval type, comprising two convergent meniscus components having an inwardly curved image field, both of said components being cemented doublets spaced axially by substantially 75% of the equivalent focal length of the combination and placed with their convex surfaces facing the front of the objective, the focal length of front doublet being substantially twice that of the other doublet and numerically greater than twice that of a third component, said third component comprising a divergent lens element positioned near and in front of the image plane and having its front surface concave.

4. A flat field anastigmatic objective of large relative aperture corrected for spherical aberration and coma, comprising three air spaced components of which the front two are doublets each of which consists of a biconvex lens cemented to the front face of a biconcave lens, said doublets being spaced axially approximately 75% of the focal length of the combination and forming a combination having an inwardly curved image field and the rear component is a single negative lens, of relatively strong power positioned near and in front of the image plane of the objective, the glass of each of the three negative lenses having a refractive index for the D line greater than 1.61 and a $\nu$ value less than 37 and the radius of curvature of cemented surfaces being in each case greater than 50% of the focal length of the objective.

5. A well corrected projection objective adapted to work at a relative aperture of 1:1.6 comprising two convergent meniscus components having an inwardly curved image field, said components being cemented doublets spaced axially by substantially 75% of the equivalent focal length of the combination and having their front surfaces convex, the radius of curvature of the cemented surface being in each case greater than 50% of the focal length of the objective, and a rear divergent lens element positioned near and in front of the image plane and having its front surface concave, the focal length of the middle component being more than one-third greater than the focal length of the rear component and substantially equal to one-half the focal length of the front component.

6. A projection objective of the Petzval type corrected for spherical aberration, astigmatism and curvature of field, comprising two convergent meniscus components having an inwardly curved image field both of which are cemented doublets separated axially by substantially 75% of the equivalent focal length of the combination and placed with their convex surfaces facing the front of the objective, the radius of curvature of the cemented surface being in each case greater than 50% of the focal length of the objective, and a rear divergent lens element of a relatively strong power positioned near and in front of the image plane and having its front surface concave.

DONALD L. WOOD.